United States Patent
Steel et al.

(10) Patent No.: US 6,823,927 B2
(45) Date of Patent: Nov. 30, 2004

(54) POCKET DOOR WITH PIVOTING PANEL

(76) Inventors: Charles F. Steel, 17202 Sandra Lee La., Huntington Beach, CA (US) 92649; Chris Steel, 17202 Sandra Lee La., Huntington Beach, CA (US) 92649

(*) Notice: Subject to any disclaimer, the term of this patent is extended or adjusted under 35 U.S.C. 154(b) by 0 days.

(21) Appl. No.: 10/382,257

(22) Filed: Mar. 5, 2003

(65) Prior Publication Data

US 2004/0173327 A1 Sep. 9, 2004

(51) Int. Cl.[7] .............................................. E05D 15/00
(52) U.S. Cl. ........................................ 160/210; 16/49
(58) Field of Search ......................... 160/210, 88, 206, 160/229 R, 352; 16/49, 288; 49/39

(56) References Cited

U.S. PATENT DOCUMENTS

| 961,726 | A | | 6/1910 | Mayr | |
|---|---|---|---|---|---|
| 2,565,383 | A | | 8/1951 | Linebaugh | |
| 2,584,874 | A | | 2/1952 | Haas | |
| 3,136,538 | A | | 6/1964 | Dimmitt et al. | |
| 3,707,014 | A | * | 12/1972 | Koivusalo | 16/52 |
| 3,708,009 | A | * | 1/1973 | Viol et al. | 160/84.09 |
| 3,718,171 | A | * | 2/1973 | Godwin | 160/210 |
| 3,984,137 | A | * | 10/1976 | Tinkle | 292/269 |
| 4,491,355 | A | * | 1/1985 | Marinoni | 292/263 |
| 4,589,463 | A | * | 5/1986 | Ryan | 160/88 |
| 4,654,907 | A | * | 4/1987 | Haugaard | 5/420 |
| 4,875,252 | A | * | 10/1989 | Falconer et al. | 16/288 |
| 4,911,219 | A | | 3/1990 | Dalrymple | |
| 4,989,808 | A | | 2/1991 | Spraggins et al. | |
| 5,285,608 | A | * | 2/1994 | Costello | 52/456 |
| 6,493,904 | B1 | * | 12/2002 | Chiang | 16/56 |
| 2003/0077410 | A1 | * | 4/2003 | Yamaguchi et al. | 428/36.2 |
| 2003/0157301 | A1 | * | 8/2003 | Murcia et al. | 428/166 |

FOREIGN PATENT DOCUMENTS

| EP | PCT/EP90/00478 | * | 10/1990 | 160/210 X |
|---|---|---|---|---|
| JP | 8-13933 | * | 1/1996 | 160/210 X |
| JP | 2003-3762 | * | 8/2003 | 160/201 X |

* cited by examiner

Primary Examiner—Bruce A. Lev
(74) Attorney, Agent, or Firm—Jackson Walker LLP

(57) ABSTRACT

This invention discloses a pocket door. The pocket door is capable of pivoting on hinges between a fame that holds the pocket door and allows it to slide in and out of a pocket to open and close a passageway. More specifically, the pocket door is hinged to the moving frame and also includes a two-part panel, where each panel is separated from an adjacent panel by a hinge that is capable of allowing the panels to move between flush engagement wherein the two panel lie in the same plane and a position where the panels are no longer lying in the same plane.

20 Claims, 4 Drawing Sheets

(CLOSED)

POCKET DOOR WITH PIVOTING PANEL

FIELD OF THE INVENTION

This invention generally relates to doors, more specifically pocket doors that are capable of pivoting on the hinges when in a closed position and which contain a door panel which can pivot on a vertical axis.

BACKGROUND

Sliding doors, also known as pocket doors, are well known for use in environments where there is insufficient space for opening a hinged door. In enclosures having curved side walls, as for example in the cabin of an airplane, sliding pocket doors are often used. Aircraft interior designers use pocket doors to save space. An example of a sliding pocket door for aircraft use is disclosed in U.S. Pat. No. 4,989,808, the specifications and drawings which are incorporated herein by reference.

Pocket doors may consist of one or two segments. Pocket doors with a single segment are intended to slide horizontally across a door opening from a pocket within a bulkhead to a close position with the leading edge of the door against a door jamb.

Aviation regulations, however, typically require doors in an aircraft interior to be capable of blowout without destroying themselves. What this means is that if there is a sudden decompression in one portion of the aircraft and the pocket door is closed, it must be capable of blowing out without shattering and possibly harming an aircraft occupant by flying debris.

Present aircraft utilizing pocket doors contain blowout panels whereby sections of the door segments are releasably retained to the door by lanyards. Also, the '808 Patent provides a pocket door which is capable, when in a close position, of pivoting on an axis adjacent the bulkhead pocket.

However, Applicants provide for improvements on any pocket door or even a swinging door and, more particularly a door having a second pivot axis between the first pivot axis and a leading edge of the door to countenance a problem where a pocket door or any other door, upon rotation, strikes an immovable object. By providing a second axis of rotation parallel to a first axis of rotation, the door panel can fold to avoid destruction of the door.

SUMMARY OF THE INVENTION

It is the general object of the present invention to provide for a sliding door moveable between a first and a second position mountable in an aircraft cabin.

It is another object of the present invention to provide for a sliding pocket door for use within an aircraft cabin which may both slide horizontally between an open and close position and, when in a close position, is capable of rotating on a first or primary rotation axis.

It is another object of the present invention to provide for a sliding pocket door in an aircraft interior which will, when in a close position be capable of pivoting on a primary axis and a secondary axis, the secondary axis between the primary axis and a leading edge of the pocket door.

It is yet another object of the present invention to provide for a sliding pocket door dimensioned for receipt within the confines of an aircraft cabin and moveable between an open and close position which sliding pocket door has multiple vertical pivoting axes.

It is another object of the present invention to provide a new and improved pocket door for use within the interior of an aircraft cabin which pocket door includes a multiplicity of vertical seams, at least one vertical seam between a primary rotation axis adjacent the bulkhead and a secondary axis between the bulkhead and the leading edge of the door which secondary axis is capable of allowing the door to rotate on a second axis.

DETAILED DESCRIPTION OF THE PREFERRED EMBODIMENT

Figure 1:
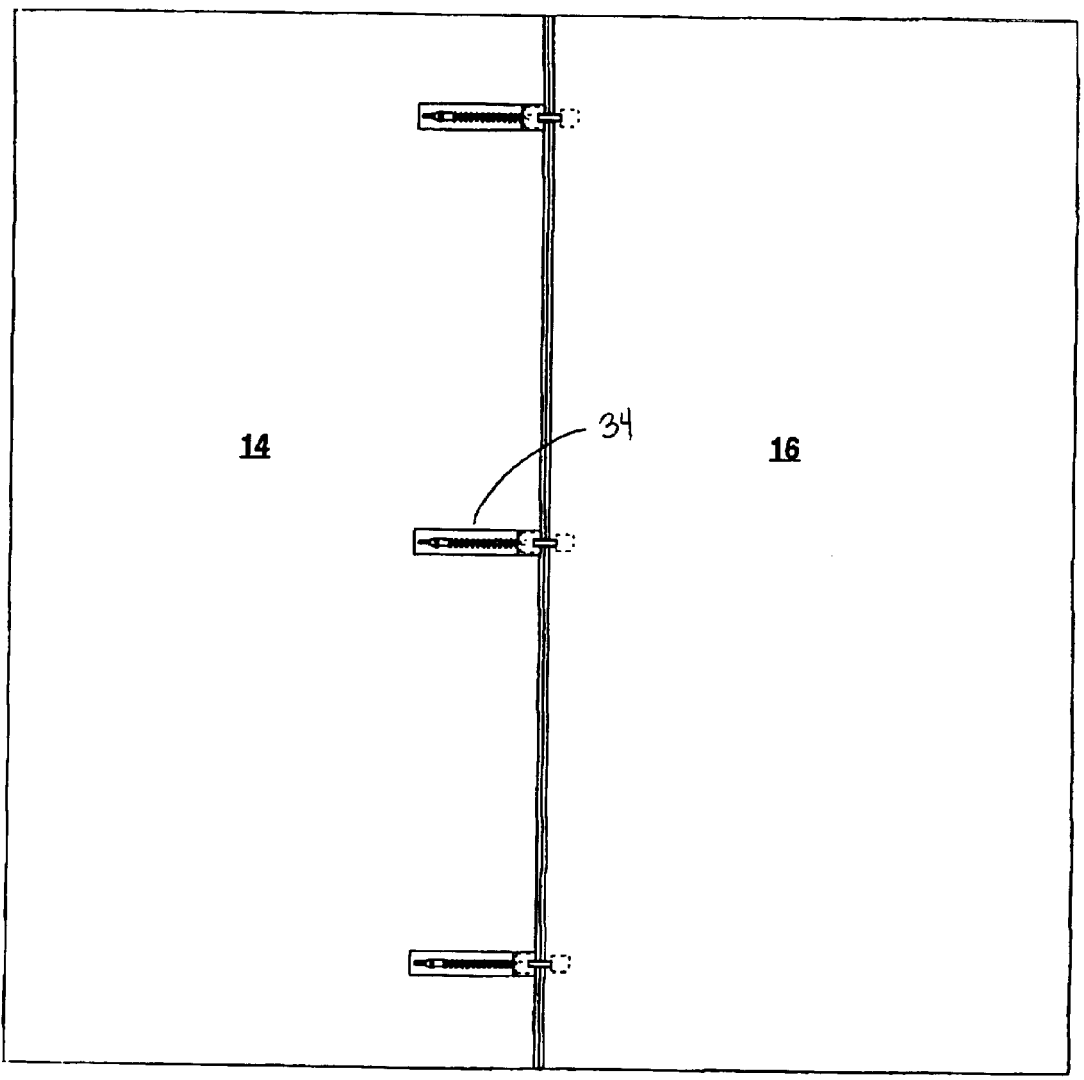
FIG. 1 is a front elevational view of a door panel for use in Applicants' novel pocket door, the door panel with a cover and removed therefrom and with walls cutaway to show the hinges therein.
Figure 2:
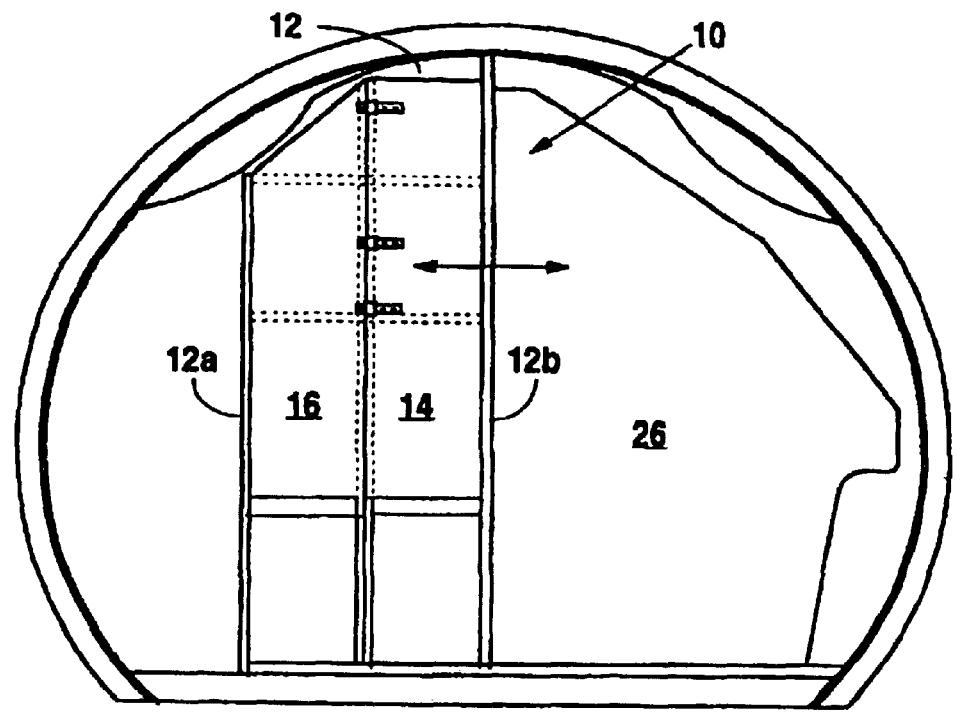
FIG. 2 is an illustration of Applicants' novel pocket door as mounted in the interior of an aircraft cabin, the pocket door in the closed position.
Figure 3A:
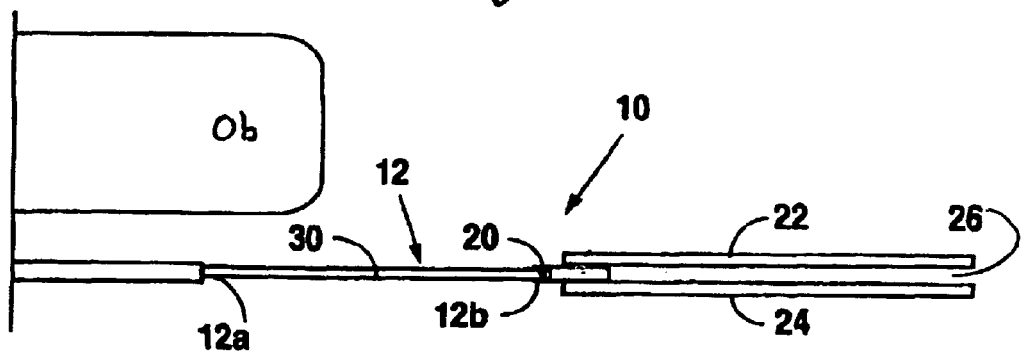
FIG. 3A is a top elevational view of Applicants' pocket door in a closed position.
Figure 3B:
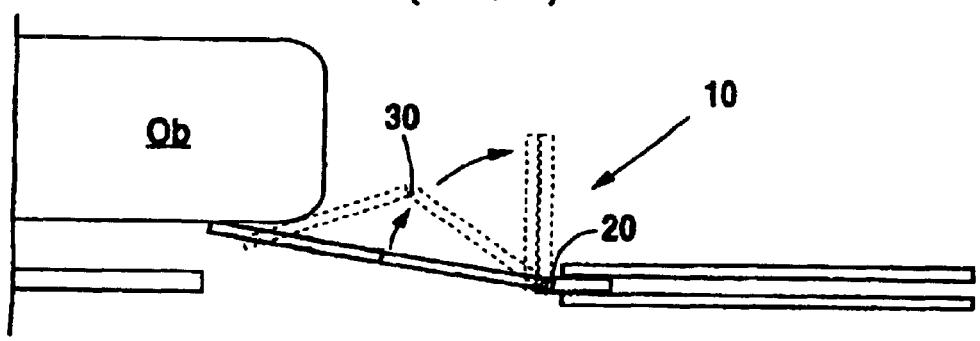
FIG. 3B is a sequential view illustrating Applicants' pocket door in a normally closed position, the first pivoting on a primary axis and, upon encountering an obstruction near the leading edge of the door panel, folding to a folded position along a secondary axis, the view being a top elevational view.

FIG. 1 illustrates the sliding door panel 12. FIG. 2 illustrates Applicants' novel pocket door 10 which includes a sliding door panel 12. FIGS. 3A and 3B illustrate two positions of Applicants' novel pocket door 10. The first position illustrated in FIG. 3A is the closed position and prevents the passage of an occupant through the door opening.

If a blowout or sudden decompression occurs to create a pressure gradient across sliding door panel 12, then Applicants' closed novel pocket door will rotate out of the sliding plane into a rotation plane about a primary axis 20 and, if the door strikes an obstruction Ob, fold in the manner illustrated in FIG. 3B as it pivots along a secondary axis 30, the secondary axis parallel and spaced apart from the primary axis 20 and laying between a first section 14 and a second section 16 of the door.

Figure 6:
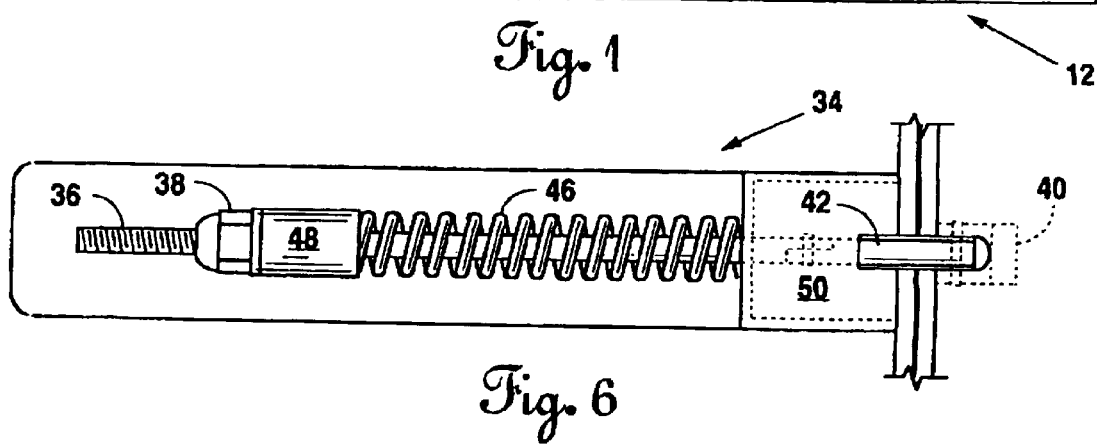
FIG. 6 is a detailed view of the hinge of Applicants' novel pocket door.
Figure 4:
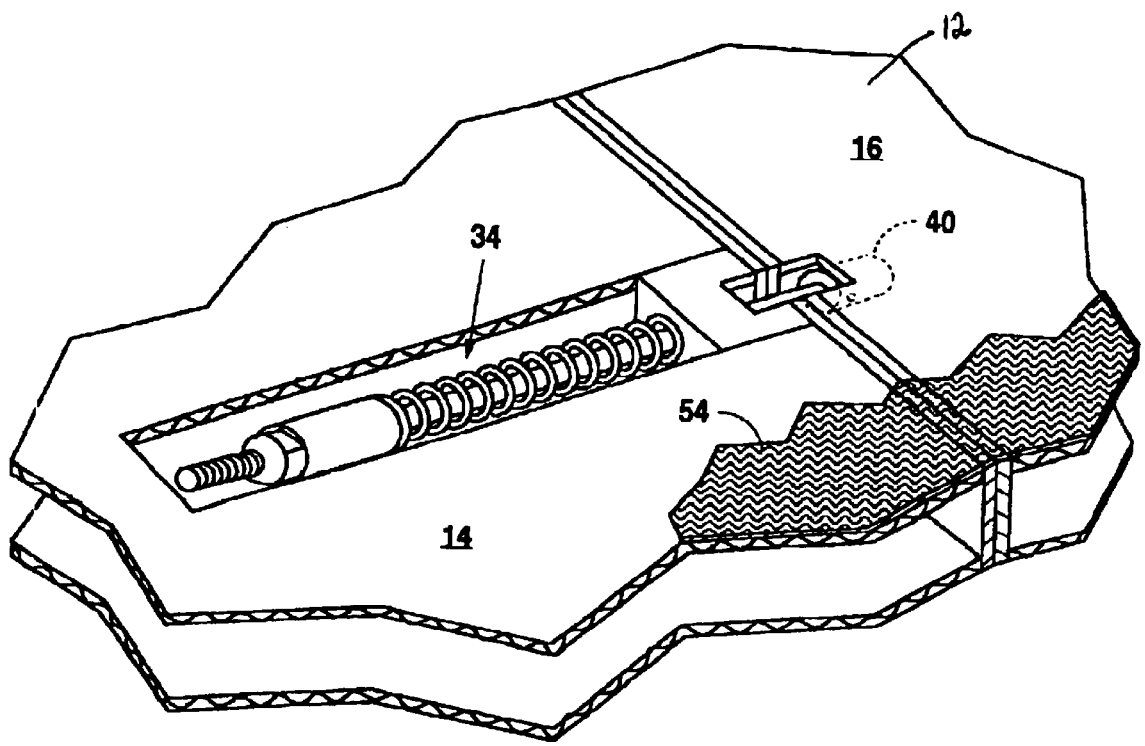
FIG. 4 is a view of where two sections of the panel meet and are held together by a hinge, FIG. 4 being a perspective view and illustrating the door panel in a normal (coplanar) position.
Figure 5:
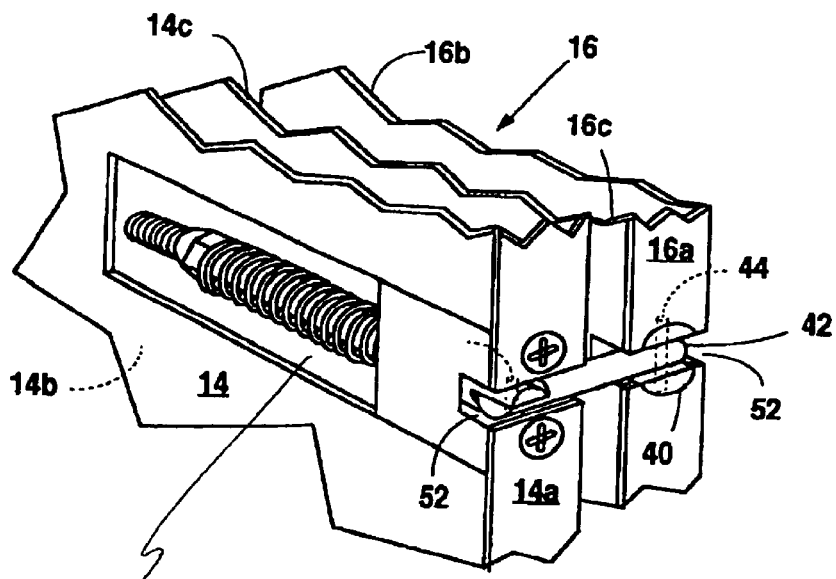
FIG. 5 is a perspective view of two adjacent door panels held together through the use of Applicants' novel hinge and in a folded or rotated position.

FIGS. 4, 5 and 6 all illustrate various views of the novel pocket door 10 including sliding door panel 12 with a novel hinge 34 between a first section 14 and a second section 16.

An overview of the accompanied drawings should provide a general understanding of the structure of Applicants' novel pocket door 10.

Tuning now to FIG. 1, it is seen that Applicants' novel pocket door 10 may be comprised of a sliding door panel 12. The sliding door panel 12 may include a multiplicity of sections, here first section 14 and second section 16. The sections would typically be similar in height and thickness as illustrated in the accompanied drawings. Furthermore, as is illustrated here, secondary axis 30 is seen to be about halfway between the primary axis and the leading edge of the door. However, it may be at any point between the primary axis and the leading edge of the door. Indeed, the point at which the secondary axis is placed may depend upon where the obstruction is that requires the fold. Further, although two sections are illustrated, requiring a secondary axis 30, the specification anticipates that there may be a tertiary axis and three sections, or even more. The number of additional axis would depend on the requirements of the door and the environment in which the door is installed.

FIG. 2 illustrates the sliding panel 12 comprised of first section 14 and second section 16. Reference is made to also to FIGS. 4 and 5 that illustrate that first section and second section both may be similarly constructed and having a pair of parallel coplanar section walls 14B and 16B spaced apart from the second pair of coplanar adjacent section walls 14C and 16C. These may be made from foam core honeycomb composite construction known in the art.

Sliding panel door 12 typically has a leading edge 12A and a trailing edge 12B. The door moves between a first position and a second position.

A first bulkhead pocket door wall 22 is spaced apart and parallel to a second bulkhead pocket door wall 24 to create a pocket 26 there between. The pocket door normally moves between an open and a closed position, the closed position illustrated in FIG. 3A and the open position not illustrated but known in the prior art and the position in which the pocket door is substantially enclosed in the pocket between first bulkhead wall 22 and second bulkhead wall 24. The position illustrated in FIG. 3B is the rotated position, obtainable upon blowout with the door in the closed position if the door strikes an obstruction Ob, as illustrated by the dotted lines in FIG. 3B.

Figure 7:
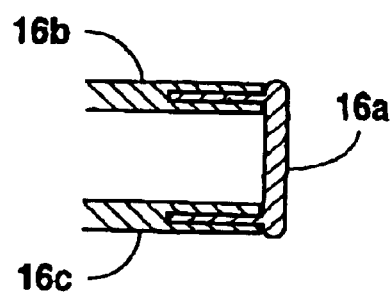
FIG. 7 is a cutaway top elevational view of the manner in which the hinge plates engage the wall panels of the door.

Turning back to FIGS. 4 and 5, and with reference to FIG. 6, it is seen that an novel hinge 34 is provided between door sections 14 and 16 where a hinge bracket 14A which includes a member spaced across between the two walls of the sections as set forth in FIGS. 6 and 7 and legs, legs typically imbedded within the composite comprising the section walls, the two hinge brackets facing one another when the door is in the normal position (either open or closed) and rotating out of flush alignment as the door goes into a folded position.

Turning now to FIGS. 4, 5, 6, 6A and 6B for details of Applicants' novel hinge, it is seen that hinge 34 includes an elongated shaft 36, the shaft having a coil spring 46 wound around a portion thereof, the shaft having a removed end on which is received an adjustable spring retaining nut 38 as well as, optionally, a spacer 48. The shaft may have a threaded portion for receiving the nut and adjustably selecting the tension in the spring so as to adjustably set the tension at which the door will begin to fold. The general construction of the hinge is to bias a folding section connector link or pin 42 which will float, connected pivotally at the near end of the shaft, thus securing the first door section 14 and pivotally connected to pin anchor 40 which is anchored tightly into second section 16. The effect of using section connector link or pin 42 pivotally mounted at either end to the two adjacent door sections is to allow them to pivot with respect to one another while remaining engaged to one another. Through the use of a bias shaft 36 and bias coil spring 46 which is connected at one end to a housing 50 fixed adjacent hinge bracket 14, the effect is to bias section connector pin 42 to the left as illustrated in FIG. 4 so as to hold flush against one another the inside faces of hinge bracket 14A and hinge bracket 16A. This holds the two door sections in a coplanar position.

Figure 6A:
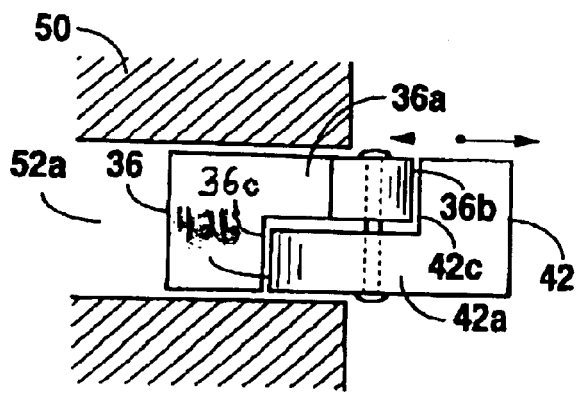
FIGS. 6A and 6B are detailed views, side elevational and top elevational, respectively, of the manner in which Applicants' interconnect pin joins the bias shaft of Applicants' novel hinge.
Figure 6B:
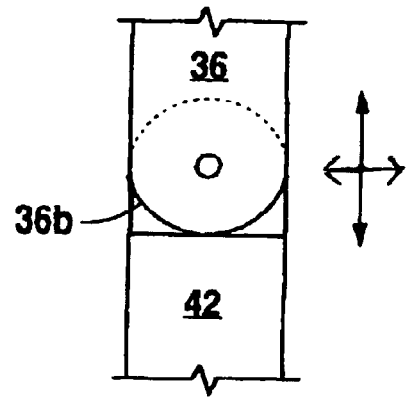

By threading down adjustable spring retaining nut 38, one can increase the torque required to pull the doors out of coplanar alignment. Shaft housing 50 includes a housing bore 50A for receiving the near end of shaft 36. Furthermore, the near end or shaft 36 defines a tongue 36A that has a rounded nose 36B. Cutout adjacent the tongue is a notch 36C. With reference to FIG. 5, FIGS. 6A and 6B, it is also seen that door connector pin has, where it is pivotally mounted to the near end of the shaft, a similarly dimensioned tongue 42A with a rounded nose 42B and a notch 42C such that when the two are layed together, the shaft diameter is reflected in the coupling created and, note that the dimensions, at least diameter is the same as the near end of shaft 36. Moreover, these dimensions are designed for snug receipt into bore 50A of the housing 50. The length of door section connector pin 42 is such that when the doors are in a flush position as illustrated in FIG. 4, the joint portion where the tongue of the connector pin and the tongue of the shaft join will be within the bore holding the doors in a flush or coplanar position. When torque is applied to overcome resistance of the spring, edge-to-edge pivoting along mutual edges of hinge bracket 14A and hinge bracket 16A will pull the near end of the shaft out of the housing and allow the door connector pin to rotate at both points of articulation. Further, with slots 52 cut into walls adjacent the hinge brackets, the connector pin 42 may pivot to hold the doors adjacent one another. This is done by providing the slots and further providing a distance between connector pin mounting pins 44 (one at the shaft end and one at the anchor end) such that the distance between adjacent pins 44 along the connector pin 42 is just slightly larger than the thickness of a door.

Drop down panels 32 may be provided that are secured within pockets along the lower edge of each door segment and are either biased through the use of a spring, depressed against the floor of the cabin or, simply under the weight of the panels will lie against the floor of the cabin. Drop down door sections 32 can slide up and down vertically within each of the door segments.

After the door panel 12 is manufactured, veneer or fabric 54 may be stretched across outer walls 14B, 14C, 16B and 16C so that the seam created at the secondary axis 30 is invisible. A very thin veneer of wood may be used, in which case a very careful slice, such as with a razor or scalpel, may be executed in the veneer right where the edges of hinge brackets 14A and 16A meet. This will prevent the veneer from shattering in case the panel moves to a folded position.

Applicant's novel hinge 34 mounted along a secondary axis 32 may be used in conjunction with a similar set of hinges at the primary axis with a tension set in the spring to first allow release along the primary axis and secondarily to allow release along the secondary axis.

Applicant's secondary axis 30 with its novel breakaway hinge 34 may also be used with the novel pullout hinge featured in U.S. Pat. No. 4,989,808, the specification and drawings which are incorporated herein by reference.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A door system comprising:
   walls defining a pocket therebetween;
   a facing wall spaced apart from the pocket;
   a door panel having a leading edge and a trailing edge, the door panel comprising a first door section and a second door section, each of the door sections having an edge face, the two door sections biased such that their edge faces are flush to one another, the door sections having substantially the same thickness, the door panel having width about equal to the distance between the pocket and the facing wall;
   means to moveably mount the door panel to the walls defining the pocket so as to move the door panel between an open position, in which the door panel is substantially within the pocket to a closed position wherein the leading edge of the door panel is flush against the facing wall and the trailing edge is adjacent the pocket;
   first pivoting hinge means at the trailing edge of the door panel for engaging the means to moveably mount the door panel such that the door panel may rotatably pivot about an axis defined by the first pivoting hinge means when the door panel is in the closed position; and
   second pivoting hinge means for securing the first door section to the second door section such that in a first position the edge faces are flush one to the other and the two door sections are coplanar and define a seam therebetween and a second position such that the two door sections are non-coplanar, said second pivoting hinge means defining an axis parallel to the axis of the first pivoting hinge means and between the trailing edge of the door and the leading edge of the door.

2. The door system of claim 1 wherein the door sections are made of lightweight honeycomb composite material.

3. The door system of claim 1 wherein the door panel includes a covering member to cover the seam between the two sections of the door panel.

4. The door system of claim 3 wherein the covering member is cloth.

5. The door system of claim 3 wherein the covering member is a wood veneer.

6. The door system of claim 1 wherein the sections are hollow and further including footers capable of receipt within the hollow door sections.

7. The door system of claim 1 wherein the second hinge means includes a multiplicity of hinges, each hinge of the multiplicity of hinges including an anchor near the edge face of the first door section and a bias shaft near the edge face of the second door section, the shaft and the anchor pivotally joined by an interconnect pin such that the interconnect pin pivots therewith and maintains the two door panels biased to the coplanar position.

8. The door system of claim 7 wherein the bias shaft includes a coil spring and means to adjust the amount of force provided by the spring to the door panels to bias the door panels to the coplanar position.

9. The device of claim 7 wherein the hinge includes a nut for receipt upon the bias shaft and wherein at least part of the bias shaft is threaded.

10. A door adapted for mounting in a pocket defined by a pair of spaced apart, parallel walls, the door comprising:
    a door panel made of at least two sections;
    mounting means to mount the door panel to a support structure;
    driving means engaging the mounting means to drive the door panel from a position within the pocket to a position without the pocket;
    a first multiplicity of hinges for engaging the door panel to the mounting means, the first multiplicity of hinges capable of allowing the door panel to rotate with respect to the mounting means; and
    biasing means to mount one section of the door panel to the second section of the door panel such that the two sections are normally coplanar, but may rotate one with respect to the other to a non-coplanar position.

11. The door of claim 10 wherein the biasing means includes a threaded shaft, a coil spring engageable with the threaded shaft, a nut for locating the removed end of the coil spring on the threaded shaft, a housing for enclosing a near end of the threaded shaft, a pivoting link and a pivoting link anchor; wherein the pivoting link anchor is attached to one of the first door section or the second door section and the threaded shaft, coil spring and housing are attached to the other of the first or the second door sections and wherein the pivoting link is rotatably attached to the near end of the shaft and rotatably attached to the pivoting link anchor.

12. The door of claim 11 wherein the door sections are comprised of lightweight composite walls.

13. The door of claim 10 wherein the two door sections meet at a seam and the seam is covered by one of: either a cloth or a veneer material.

14. The door of claim 10 wherein the door sections have about the same thickness.

15. The door of claim 10 wherein at least one of the door sections includes a pair of spaced apart walls and a hinge bracket having a generally "U" shape.

16. The door of claim 15 wherein the legs of the "U" are embedded within each wall of the pair of spaced apart walls.

17. The door of claim 10 wherein the door sections include footers.

18. The door of claim 10 wherein the first multiplicity of hinges includes a threaded shaft, a coil spring engageable with the threaded shaft, a nut for locating the removed end of the coil spring on the threaded shaft, a housing for enclosing a near end of the threaded shaft, a pivoting link and a pivoting link anchor; wherein the pivoting link anchor is attached to the mounting means and the threaded shaft, coil spring and housing are attached to the first door section and wherein the pivoting link is rotatably attached to the near end of the shaft and rotatably attached to the pivoting link anchor.

19. The door of claim 10 wherein the first multiplicity of hinges biases the door panel in a position coplanar with the pocket in which the door is mounted.

20. The door of claim 10 wherein the door panel includes a third section, the third section joined to the second section by a bias means, bias means to hold the third section so that it is coplanar to the second door section, but capable of allowing the third door section to rotate with respect to the second door section.

* * * * *